C. P. G. LINDE,

Assignor to F. W. WOLF.

REFRIGERATING AND ICE MAKING APPARATUS.

No. 10,522. Reissued Sept. 16, 1884.

Witnesses:

Chas. E. Gaylord.

Douglas Dyrenforth

Inventor:

Charles P. G. Linde,

By Dyrenforth & Dyrenforth

Attorneys.

NORRIS PETERS, INC., LITHO. WASHINGTON, D. C.

UNITED STATES PATENT OFFICE.

CHARLES P. G. LINDE, OF WIESBADEN, PRUSSIA, GERMANY, ASSIGNOR TO FREDERICK W. WOLF, OF CHICAGO, ILLINOIS.

REFRIGERATING AND ICE-MAKING APPARATUS.

SPECIFICATION forming part of Reissued Letters Patent No. 10,522, dated September 16, 1884

Original No. 228,364, dated June 1, 1880. Application for reissue filed July 31, 1884.

*To all whom it may concern:*

Be it known that I, CHARLES P. G. LINDE, formerly of Munich, Germany, now of Wiesbaden, Prussia, Germany, have invented a new and Improved Refrigerating and Ice-Making Apparatus; and I hereby declare the following to be a full, clear, and exact description of the same.

My improvements relate to that class of refrigerating or ice-making apparatuses in which the refrigerating effect is obtained by the evaporation of a volatile liquid, the vapors of which are compressed by a pump into a condenser and then liquefied, ready to be again subjected to the process of evaporation.

The objects of this invention are the following: first, to prevent overheating of the pump, and thus avoid the loss of motive power and the necessity of cooling the pump by artificial means; second, to effect a more perfect packing than has hitherto been provided of the stuffing-box of the pump, and the employment of the stuffing medium to lubricate the points of contact of the working parts; third, to provide means for replenishing the apparatus, while in operation, with pure liquid ammonia; fourth, to provide means for the production of transparent ice, and means for releasing the same from the carriers.

My invention consists, first, in the peculiar construction of parts, whereby overheating of the pump is prevented by a portion of the liquid ammonia being caused to be carried along with the vapors to the pump and evaporated therein at the proper time by the heat generated by the compression action of the pump; second, in a lubricator chamber or collector placed in the delivery-pipe, and connected with a lubricator chamber or collector in the stuffing-box of the pump, whereby the said stuffing-box of the pump shall be tightly packed and the internal parts lubricated; third, in connecting the distilling apparatus directly with the exhaust-pipe of the pump; fourth, in a revolving drum having radial ice-collecting cells, to enable the ice to be formed in thin films or layers, whereby it shall be rendered transparent; and, fifth, in a device to facilitate the removal of the ice when formed, all as hereinafter described.

Figure 1:
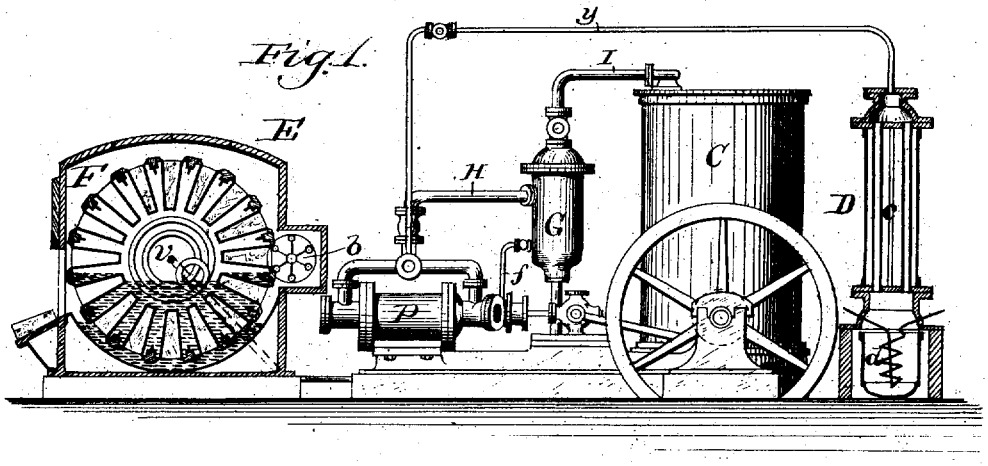
Figure 2:
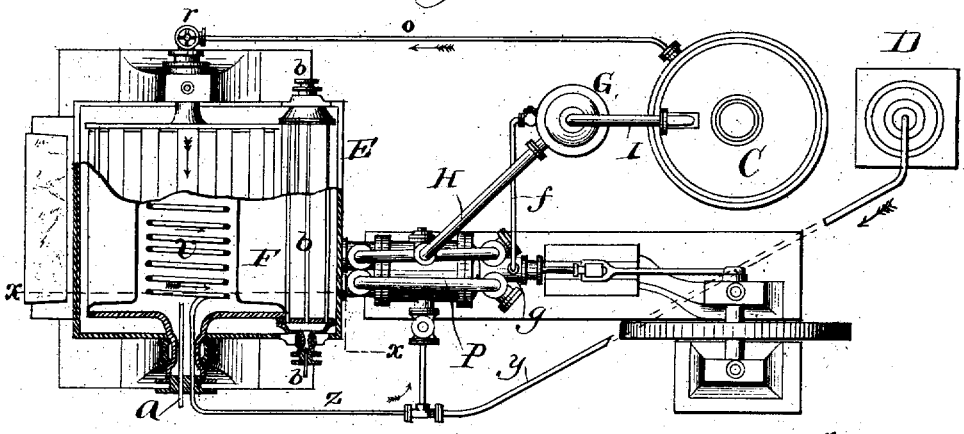
Figure 3:
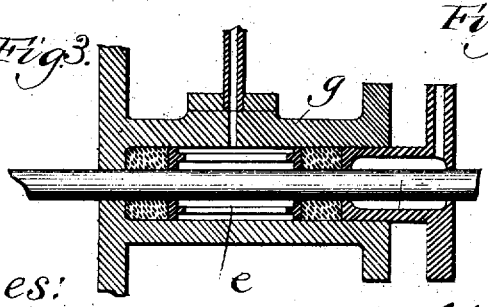

In the drawings, Figure 1 is an elevation of the apparatus with the freezing-chamber in section; Fig. 2, a plan view with the freezing-chamber partially broken open; Fig. 3, an enlarged longitudinal section of the stuffing-box, and Fig. 4 a cross-section of the same.

In ice and refrigerating machines hitherto in use and depending for their cooling effect upon the expansion into vapor of a volatile liquid, which vapor is then liquefied by mechanical compression to be used over again, the overheating of the compressor-cylinder, caused by the compression of the vapors and resulting in great loss of motive power, has proved a great obstacle to their successful operation, necessitating, to overcome the difficulty, the employment of artificial means—such as a water-jacket for the cooling-pump—thus encumbering the machine, and thereby increasing the cost of manufacture, as also, by the incidental loss of motive power, greatly increasing the expense of its use. The difficulty has been recognized by Mr. M. Ledaux, and commented upon by him in his "Treatise on Ice-Machines," (see D. van Nostrand's Scientific Series, No. 46, edition of 1879, page 86, beginning with the 14th line,) wherein the following appears: "Though it is a well-known fact that overheating of the compressor-cylinder would be prevented by the employment of a liquefiable gas, which superheats under compression, to introduce into the compressor-cylinder at each stroke of the piston a mixture of liquid and vapor in such proportion that the entire mixture shall assume the state of a gas at the end of compression, it is equally true that no practical means have yet been devised for realizing this condition. We therefore content ourselves, in using freezing-machines requiring a liquefiable gas, with introducing into the cylinder of the compressor the gas without an admixture of liquid; and since the gases of dioxide of sulphur and of ammonia superheat during compression, a machine in which either of these gases is employed produces effects during a part of its operation similar to those produced by an air-machine." Further on, on page 88, line 9 from the bottom of the page, he says: "It would therefore appear that the theoretical efficiency of freezing-machines which superheat the gas is less than that of machines which work without superheating."

I have devised a machine in which not only superheating of the compressor-cylinder is prevented, but whereby it is maintained in an exceedingly cold state during the operation of the machine, by introducing into the latter a proper mixture of such proportions of liquid and vaporized ammonia that the state of saturation shall be just attained at the end of compression, and the following is a description of the construction by means of which this result is accomplished.

C is the condenser; E, the refrigerating or freezing chamber, and P the pump.

The condenser C comprises an upright tank or cylinder containing a coiled pipe immersed in cold water.

The refrigerator E consists of a tank partially filled with water, and a revolving drum, F, provided with radiating cells to become immersed in the water contained in the tank from which ice shall be produced. The drum is partially filled with a non-freezing liquid, and contains a coiled pipe, *v*, the opposite ends of which pass through the opposite hollow journals of the drum. A conduit, *o*, is connected at one end with one end of the coil in the condenser C, and at its opposite end with one end of the coil *v*, a valve, *r*, being arranged in the conduit *o*, to afford means for regulating the quantity of liquid ammonia admitted into the coil *v*. The pump P communicates with the coil *v* in the refrigerator by means of a suction-pipe, *z*.

The drawings show my device in the form of an ice-making machine; but it should be stated that it is equally useful as a refrigerator for cooling off and maintaining at a desired low temperature the atmosphere in a room without forming ice, and when employed in the last-named capacity only the drum F, carrying the cells for collecting ice formed of the water surrounding it, and other parts, to be hereinafter described, may be dispensed with, leaving the coil *v* immersed in a non-freezing liquid contained within the tank E. In either case the operation of the device remains the same.

The pump P being set in motion, liquid ammonia from the condenser C is admitted, by way of the conduit *o*, in a desired quantity, through the valve *r*, into the coil *v*, which has an area, preferably, of about three-fourths to six square inches, depending upon the number of coils used and the capacity of the machine, and is thence sucked by the action of the pump P into the latter through the suction-pipe *z*. The liquid ammonia becomes only partially vaporized in passing through the coil *v*, owing to the velocity it attains, which is due to the suction produced by the pump. To avoid vaporization within the suction-pipe *z* of this non-vaporized portion of the stream passing into it from the coil *v*, the suction-pipe must have an area equal to or greater than that of the coil, since, were it smaller, compression would occur within the suction-pipe, thus increasing the temperature of the latter, and causing the compressed product to be conveyed into the pump-cylinder in a state whereby the latter would become superheated by the compression action of the pump in further compressing the already contracted vapor. The necessary relative proportions above mentioned of the areas of the coil *v* and suction-pipe *z* permit the passage of the saturated vapor induced by the action of the pump into the cylinder of the latter, where compression takes place. To avoid overheating of this cylinder by the heat generated by the compression occurring within the same, its area must be of such proportion to that of the coil as to cause all the heat generated to be taken up by the liquid of the mixture in its expansion into vapor, and such as to produce evaporation of the same at the end of the compression action. To effect this the area of the pump-cylinder must be at least eight times that of the coil, this being the proportion for machines of the smallest size, which increases proportionately for the various larger sizes of machines.

It should here be stated that the drawings show only one refrigerating-coil, this being the number required in a machine of the smallest size. An increase in the machine and its capacity does not, however, call for an increase in the area of the one refrigerating-coil, but necessitates the multiplication of the number of coils of the same area, which of course, for the reasons hereinbefore given, makes it essential that the area of the suction-pipe *z* shall equal or exceed the combined areas of all the coil-pipes employed, and also that the area of the pump-cylinder be increased in proportion. An increase in the number of refrigerating-coils requires a similar increase in the number of coils in the condenser C, all of which should communicate with the conduit *o*.

H is a pipe connecting the pump P with a lubricator collector or chamber, G, hereinafter to be described; and I, a pipe similar to the pipe H, leading from the collector G to the coil *t* in the condenser C. The area of these pipes H and I should be sufficiently large to permit the entrance of the compressed vapor from the pump into the condenser without being further heated, whence it is again supplied to the refrigerator through the conduit *o* by means of the valve *r*, undergoing the same conditions as hereinbefore described. The quantity of liquid ammonia admitted to the coil *v* is regulated by the valve *r*, as shall be required to attain a temperature of the saturated vapors in the compressor-cylinder corresponding to that of the pressure in the condenser. The temperature of the delivery-pipes H I will always provide a precise guide for the operator in regulating the supply of ammonia through the valve *r*.

Figure 4:
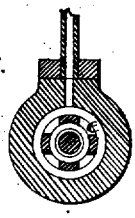

To pack the stuffing-box of the pump P tightly, a chamber or collector, *e*, is formed in the stuffing-box around the piston by means of two india-rubber rings, (see Figs. 3 and 4,)

which chamber is connected by a small pipe, *f*, with the collector G, arranged in the delivery-pipes H I in open connection with the condenser, so that the pressure in the condenser will force the lubricant into the stuffing-chamber. The pressure in the condenser, never being lower than the highest pressure in the pump, will force the lubricant into the stuffing-chamber under great pressure, and if any leakage should occur in the said stuffing-box the lubricant will be forced on one side into the open air and on the other side into the pump-cylinder. By this means an exit of the ammoniacal vapors or the admission of air to the same is prevented, and the lubricant which enters the pump-cylinder will be carried along with ammoniacal vapors, lubricating the parts through which it passes, and will be returned to the collector G.

In order to render it possible to utilize commercial liquid ammonia, and so replenish the machine with the ammonia obtained from it, which shall be devoid of water, I make use of a distilling apparatus, D, which has in its lower part the vessel *d*, to contain commercial liquid ammonia, which is vaporized by the application of heat or by other suitable means. Above this vessel I arrange a tube-condenser, *e*, which is kept cool on the exterior by water. These vapors pass through this condenser-tube, depositing the aqueous vapors generated by distillation, and are conducted by a pipe, *v*, directly to the exhaust *z*, and thence to the pump in a thoroughly-pure state, the supply of vapor to the pump being regulated by means of a suitable valve.

The next feature of my invention relates to the production of transparent ice, which is obtained by the revolving drum F, provided with radiating cells and arranged in refrigerating-chamber E, which contains water from which the ice is to be frozen. The drum is partially filled with non-freezing liquid—such as brine—intensely refrigerated by the evaporation of the volatile liquid in the stationary coil *v*, arranged in the said drum. The ends of this coil pass through the hollow journals of the drum F, and are connected at one end with the conduit *o*, and at the other with the exhaust *z*. During the rotation of the drum the cells will be alternately immersed in the water, which will be congealed in thin films or layers therein until the said cells are entirely filled with ice, which latter, owing to the gradual freezing of successive water-films and the movement of the water with reference to the ice surface, will be clear and entirely free from the milky appearance usual in ice formed by the various apparatuses in general use. The ice having attained a proper thickness, the cold brine is drawn off by the tube *a*, and warm water, brine, or steam is introduced into the revolving drum to loosen the ice in the cells.

If the blocks of ice are frozen together on the surface, it becomes necessary to separate them before they can be removed. To accomplish this I arrange a revolving device, *b*, comprising a shaft parallel to the axis of the drum, provided with radiating arms which carry steam-pipes, to which steam is admitted from a steam-vessel. These tubes, coming into contact with the ice by the rotation of the drum, and being heated, will make incisions in the ice, thus separating the blocks of ice contained in the cells of the drum from the wood blocks between the said cells, and allowing the said blocks of ice to fall out during the rotation of the drum.

I am aware that the piston and internal parts of pumps of ice-machines have been lubricated with glycerine, and I am also aware that a drip cup or trap has been placed in the pipe leading from the pump to the condenser, and connected with the induction-pipe by a small pipe provided with a cock, so that when the said cock is opened the glycerine in the drip cup or trap will be forced back into the induction, to be again utilized by the pressure of the gas on its passage to the condenser.

What I claim as new, and desire to secure by Letters Patent, is—

1. In an ice or refrigerating machine employing a gas liquefiable by mechanical compression, the combination, with the compressor-cylinder, of mechanism whereby a mixture of such proportions of liquid and vapor shall be automatically introduced into the said compressor-cylinder that the entire mixture shall assume the form of gas at the end of compression, substantially as described, and for the purpose set forth.

2. In an ice or refrigerating machine employing a gas liquefiable by mechanical compression, a pump, P, in combination with an evaporating-coil, *v*, in contact with a body to be cooled, and provided with means for regulating the supply of liquid to be vaporized, and a suction-pipe having an area not less than that of the refrigerating-coil, the proportion of the area of the said evaporating-coil to that of the cylinder of the said pump being not less than one to eight, substantially as described, and for the purpose set forth.

3. In an ice or refrigerating machine employing a gas liquefiable by mechanical compression, the combination of a pump, P, condenser C, communicating with the said pump, refrigerating-chamber E, evaporating-coil *v*, having an area not greater than one-eighth of that of the cylinder of the pump P, conduit *o*, connecting the condenser C with the coil *v*, and provided with a valve, *r*, and suction-pipe *z*, having an area not less than that of the coil *v*, and providing communication between the said coil and the pump P, all being constructed and arranged to operate substantially as described, and for the purpose set forth.

4. In a refrigerating or ice-making machine, the pump P and condenser C, in combination with the chamber G, containing a lubricant and placed in the delivery-pipes H I, and connected directly with the stuffing-box of the pump, whereby the lubricant shall be held under pressure in the said stuffing-box, to pack the same and to lubricate the piston, substantially as described.

5. In an ice-making machine, the revolving drum F, provided with radiating cells, in combination with the refrigerating-chamber E and the evaporating-coil *v*, substantially as and for the purpose set forth.

6. In an ice-making machine, the combination, with the revolving drum F and chamber E, of mechanism for separating blocks of ice formed in the cells of the drum F, when the said blocks of ice shall be frozen together on the surface, substantially as described.

7. In an ice-making machine, the combination, with the revolving drum F and chamber E, of the revolving device *b*, for separating blocks of ice formed in the cells of the drum F, when the said blocks of ice shall be frozen together on the surface, said device comprising a shaft provided with radial arms carrying steam or hot-water pipes, substantially as described.

8. In an ice or refrigerating machine, the combination, with pipe *z* and the pump P, of the distilling apparatus D, having the tube-condenser *c* and vessel *d*, and provided with means for controlling the supply of vapors to the said pump, as and for the purpose set forth.

CHARLES P. G. LINDE.

In presence of—
JAMES HENRY SMITH,
CARL ED. HAHN.